United States Patent [19]

Burkhardt

[11] Patent Number: 4,501,353
[45] Date of Patent: Feb. 26, 1985

[54] CHAIN CONVEYOR

[76] Inventor: Volker Burkhardt, Lerchenstrasse 29, 7085 Bopfigen, Fed. Rep. of Germany

[21] Appl. No.: 446,269

[22] Filed: Dec. 2, 1982

[30] Foreign Application Priority Data

Dec. 5, 1981 [DE] Fed. Rep. of Germany ....... 3148177

[51] Int. Cl.³ .............................................. B65G 17/00
[52] U.S. Cl. ..................................... 198/779; 198/861
[58] Field of Search ............... 198/779, 860, 861, 838, 198/845

[56] References Cited

U.S. PATENT DOCUMENTS

| 3,605,993 | 9/1971 | DeRozario | 198/779 |
| 3,605,994 | 9/1971 | Parlette | 198/860 |
| 3,690,433 | 9/1972 | Buldini | 198/779 |
| 3,739,904 | 6/1973 | Windstrup | 198/860 |
| 3,916,797 | 11/1975 | Block et al. | 198/779 |
| 4,062,444 | 12/1977 | Nakov et al. | 198/838 |
| 4,339,030 | 7/1982 | Hirata | 198/779 |

FOREIGN PATENT DOCUMENTS

| 2735987 | 3/1979 | Fed. Rep. of Germany | 198/779 |
| 1391254 | 4/1975 | United Kingdom | 198/861 |

Primary Examiner—Leslie J. Paperner
Assistant Examiner—Jonathan D. Holmes
Attorney, Agent, or Firm—Walter H. Schneider

[57] ABSTRACT

A chain conveyer with accumulator conveyer chains and one or several support members with runner tracks for the continuously circulating chain rollers, or chain, is disclosed. Between the chain rollers there are arranged carrier rollers which are rotatable relative to the chain rollers. The support member exhibits a substantially closed box profile or similar trough-like profile, which includes at its upper end a continuous longitudinal slot for passage therethrough of the carrier rollers. The runner tracks for the chain rollers are respectively arranged on horizontal projections which are joined to respective vertical side walls. The side walls are joined by a lower transverse member.

3 Claims, 2 Drawing Figures

CHAIN CONVEYOR

BACKGROUND OF THE INVENTION

1. Field of the Invention

The present invention relates generally to improvements in or relating to conveyers. More particularly, the present invention is concerned with chain conveyers wherein the chains include chain rollers and carrier rollers and the chain rollers are supported on runner tracks which, in turn, are supported by one or several support members. The carrier rollers of the chain are arranged between the pertaining chain rollers and rotatable relative thereto.

Such chain conveyers utilize chains which are equipped with various rows of rollers. The lower, return, rollers then become the chain rollers per se, and the upper rollers carry the items to be transported in the fashion of carrier rollers in a manner comparable to non-powered roller conveyers or roller beds. Among other purposes, such conveyers are employed in the assembly line operations. In the normal situation the transport of items to be transported is by rolling friction alone. However, when there occurs an accumulation of items to be transported, the upper rolls rotate with respect to the chain rollers, due to which there is only exerted a relatively minor accumulation-pressure on the material to be transported. This means that during normal operation there would not occur a relative movement between the items to be transported and the carrier rollers. Only should there occur an accumulation or similar bottleneck in the operation, the chain will continue to circulate and moves beneath the material to be transported with its rollers.

The chain rollers of the chain are generally supported on carriers, yokes or similar support members, which are equipped with runner tracks. In most cases single or double stranded systems are used in combination.

2. Description of the Prior Art

Heretofore the supports for the chain rollers were provided, for example, by simple sheet metal components, whereby a horizontal section of such component would be in the form of a roller track. The disadvantage then arises that these sheet metal components would be subjected to considerable bending, particularly when transporting heavy items, which could lead to jamming and a high wear. When the roller tracks became worn, the entire support had to be removed and replaced by a new one which gave rise to undesireable down times of the conveyer assembly.

SUMMARY OF THE INVENTION

There has continued to remain, therefore, a need for improving the conveyer briefly described.

It is an object of the present invention to provide such chain conveyer which is of rather sturdy construction.

It is also an object of the present invention to provide a chain conveyer which is less subjected to wear, or in which worn components can be readily exchanged by spare components.

These various objects are met in accordance with the present invention thereby that the support member exhibits a substantially closed box-like or trough-like profile structure, which includes at the upper side or end a continuous slot, passage, or similar opening, for the passage therethrough of the carrier rollers of the conveyer chain. The runner tracks for the chain rollers are supported on horizontal portions or projections which are interconnected to two substantially vertical lateral side walls or members, which, in turn, are interconnected by means of a lower transverse base member.

In accordance with one aspect of the invention, the support member exhibits a considerable warp-resistance and, as well, an improved capacity for straight guiding. Also, the runner tracks are more readily produced and with greater accuracy.

An advantageous embodiment of the support member includes a member having been extruded, for example, of aluminum. Such a support member can be economically produced and in a simple manner, it is readily further treated, need not to be painted or similarly protected, and has a pleasing appearance.

In accordance with a further aspect of the invention it is contemplated that the runer tracks are equipped with separate runner rails or support bars, which, for example, can be made of spring steel, plastic/synthetic material and the like. It is of advantage to use materials having a low friction coefficient. A further and substantial advantage resides therein that the support bars can be replaced, particularly when they become worn, without necessitating a complete replacement of the support member.

In accordance with this aspect of the invention it is also possible to cover, from above, the runner tracks and the chain rollers by means of the claws or claw members which can be connected to the support members.

Covering of the runner tracks by means of the claws and the pertaining cover prevents injuries and enhances cleanliness, through the protection against dirt.

It is also of advantage that the base bars of the claws are secured to the support member, particularly laterally adjacent to the chain rollers, whereby, in the case of separate runner rails, also the runner rails are clamped to the support member by the base bars. This embodiment represents not only a simple method of securing the claws, but at the same time also the rails are secured to the support. The securing of the rails can be accomplished as indicated by the base bars of the claws, or, of course, by other, additional, securement means.

When lubrication of the chain is desired, one can arrange in a simple manner that in the lower region of the support member there is provided an oil sump for the return portion of the chain rollers. In this manner, the return portion of the chain is passed through the oil sump for lubrication.

The return tracks for the chain rollers can be provided by horizontal sections in the vicinity of the lower transverse base member, whereby there may be provided at such locations an insert member of plastic/synthetic material. Such an embodiment will lead to a more quiet and friction-reduced return of the chain and, furthermore, when using an insert member, this can readily be replaced upon becoming worn by a spare component.

It is further advantageous that the side walls are furnished with longitudinal slots or grooves which extend in horizontal direction. Such longitudinal grooves can then serve to mount to the support various components and devices. Thus, for example, one or several grooves may serve for a lateral guide for the items to be transported, and/or there may be secured, as well, on the outer side of the support, the lower end of a cover. The cover serves, for example, to protect laterally arranged switches and/or sensing devices, for example, limit switches, provided on the support member.

In accordance with another aspect of the invention the lower transverse base member extends with its respective ends beyond the side walls, particularly in the lower extent. The projecting base portions provide a support to which there may be secured, for example, drive units, unit-components and the like devices. Similarly, the support itself may be secured here to a base.

Further embodiments of the invention and other inventive features are contained in the claims.

DESCRIPTION OF THE DRAWINGS

In the drawings, which illustrate that which is presently regarded as the best mode of carrying out the invention.

DESCRIPTION OF THE PREFERRED EMBODIMENT

Figures 1, 2:
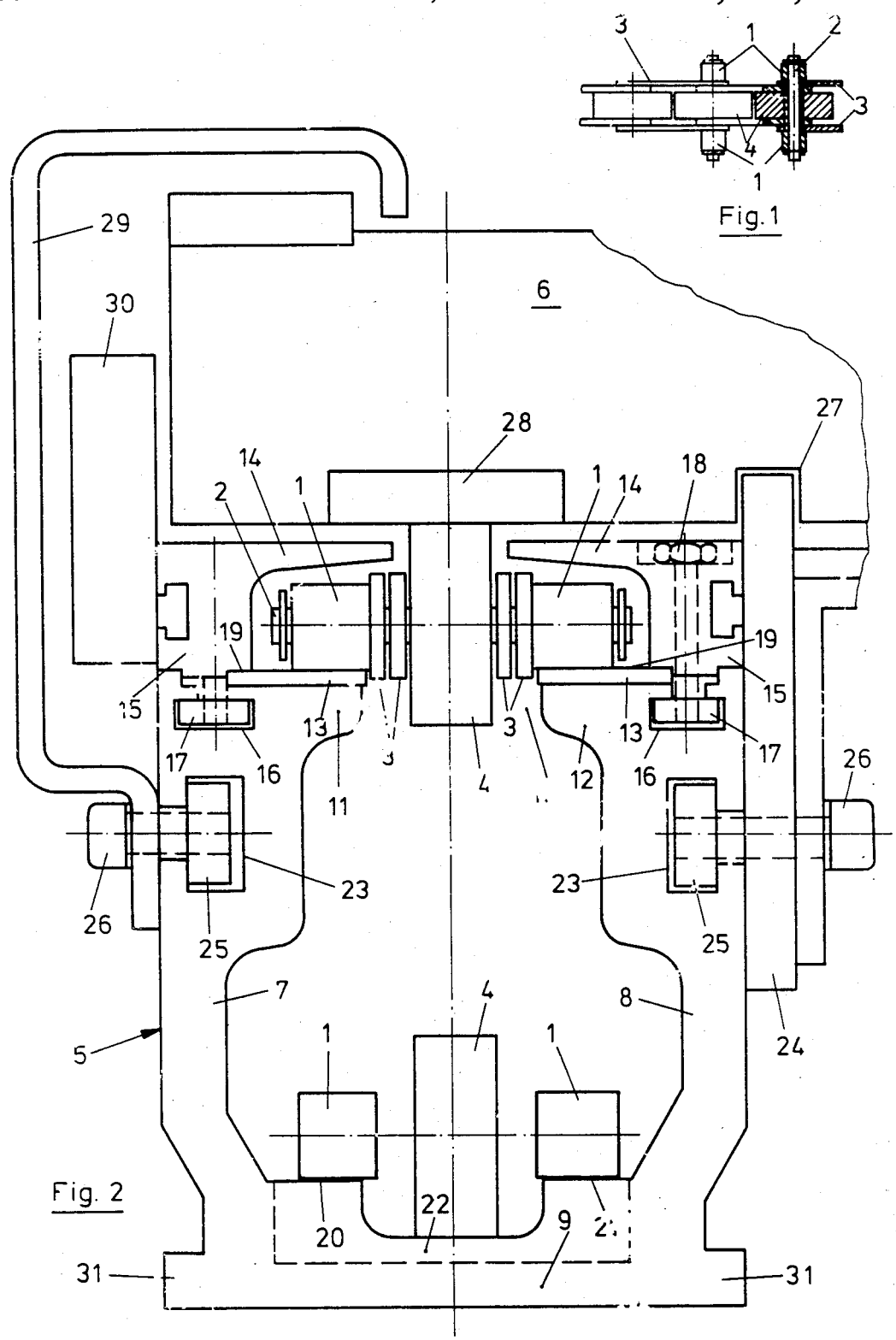
FIG. 1 is a top plan view, partly in cross section, of a short portion of a conveyer chain.
FIG. 2 is a end elevational view of a chain conveyer with a support in accordance with the invention.

A conveyer chain, to serve as accumulator conveyer chain, includes a plurality of chain rollers 1 which are rotatable arranged on elongated pins or shafts 2. The chain rollers 1 are connected to one another by chain side bars 3, to form a continuously circulating chain. Between two chain rollers 1 arranged respectively on a common shaft 2, and the pertaining chain side bars 3, there are arranged carrier rollers 4. These have a larger diameter than the chain rollers 1 and they are also arranged rotatable on the shaft 2. The carrier rollers may be of a plastic/synthetic material, steel or other material. The carrier rollers 4 are adapted to maintain, during a planned or even during an accidental accumulation or bottleneck situation of the items to be transported, a circulating or respective rotational movement without damage to the items.

In FIG. 2 there is shown in greater detail the support member 5. Generally there is arranged such a support member on each longitudinal side, and the items to be transported, designated by the numeral 6, are therebetween transported by way of the carrier rollers 4. As is readily apparent, the support member 5 is generally in the form of a closed box-like, or trough-like, structure, and it includes two side walls or side members 7 and 8, respectively, as well as a lower transverse base member 9. The support member 5 is thus generally closed from all sides, however, there remains at the upper end or side a continuous slot, passage or similar opening, 10 which has a width which is greater than that of the rollers 4. The rollers 1 are in running contact on the horizontal portion 11 and 12, or similar projections, which are unitary, interconnected, or otherwise operatively connected to the side walls 7 and 8, respectively. The runner tracks are provided by separate runner rails or runner bars 13 which are secured, in turn, to the horizontal portions 11 and 12, respectively. As required, separate runner bars need not be provided. The rollers 1 are then in direct contact with the horizontal projections 11 and 12, respectively, of the support member 5, which may be extruded and of aluminum or an aluminum alloy.

Laterally adjacent to the rollers 1 there is respectively provided a claw or claw member 14 which includes a base bar 15 by means of which it is secured to the support member 5. The securement of the claws 14 is achieved by longitudinal grooves or similar recesses 16 in the side walls 7 and 8, respectively, of the support member 5, and, in particular, by way of cam pieces 17 arranged in the grooves 16, into which cam pieces 17 there can be threaded the retaining screws or similar threaded fasteners 18 which extend through the the wall of the claw 14. Thus, the claws 14 are clamped to the support member 5 and they can be readily removed, as required. For simultaneous clamping of the rails 13, the claws 14 are equipped, at their lower side which is directed towards the rails 13, with shoulder portions 19 under which, on securing the claws 14 to the support member 5, the rails 13 can be clamped down at the same time that the claws 14 are secured.

The return of the accumulator chain is carried out in the interior of the support member 5. For this there are provided return track means 20 and 21 for support of the rollers 1 in the vicinity of the base member 9. The return of the chain is only diagramatically indicated by the rollers 1 and the carrier rollers 4. It is, of course, not a requirement that the return tracks are supported directly on the base members 9. Instead, the tracks can be provided by a separate insert member 22, see FIG. 2 at the bottom, in dash lines. For example, the insert member 22 can be clamped into the base member 9. This will facilitate the replacement of the insert 22 when required.

Where lubrication is to be provided for the chain, there can be provided an oil sump in the lower portion of the support member. This can readily be arranged since the pertaining vicinity is closed in from all sides.

The side walls 7 and 8 are respectively furnished with longitudinal grooves 23 which can serve to mount various components to be secured to the support member.

Thus, for example, there is secured a lateral guide 24 for the item 6, by way of a cam piece 25 and a retainer screw 26. The guide 24 includes generally a rod which extends into a recess 27 in the item 6, in this particular case a pallet, to ensure that the pallet is accurately guided. The item 6 is furthermore provided with a runner bar 28, which serves as a wear part, with which runner bar 28 the carrier rollers 4 come into operative contact.

In groove 23 of the side wall 7 there is connected the lower end of a cover 29, made of sheet metal or the like material, with the securement also being effected by cam pieces 25 and retainer screws or similar threaded fasteners, or pins, 26. The cover 29 serves to protect the devices, for example, a limit switch 30, which are laterally arranged at the support 5. The switch 30 is connected to the claw 14, or the support 5, as required, by means of a groove and cam pieces, as described earlier, so as to form a unit with the pertaining member.

The two side walls 7 and 8 are tapered at their respective lowermost ends, such that the base member 9 projects therebeyond on both sides, and thereby forms support surfaces 31. These support surfaces can then serve to accommodate further parts or components on the support, or the support member itself may be placed on a base using such support means.

Reference in this disclosure to details of the specific embodiment is not intended to restrict the scope of the appended claims, which themselves recite those features regarded as essential to the invention.

I claim:

1. A chain conveyor system adapted for continuous circulation and the movement of material comprising a plurality of chain roller pairs connected together by side bars to form a continuous chain; a shaft rotatably supporting each chain roller pair, said shaft further rotatably supporting between said chain rollers a carrier roller of greater diameter than said chain rollers; a unitary support member having a generally trough-shaped cross-sectional configuration comprising two upwardly extending side members connected by a transverse base member, the upper ends of said side members being sufficiently separated so as to permit movement of said carrier rollers and said chain roller side bars therebetween; a runner track provided on the upper surface of each side member independent from its respective side member for supportin said chain rollers in the advancing stage of said chain circulation; a runner track provided on said transverse base member for supporting said chain rollers in the returning stage of said chain circulation; a recess in said upper surface of each side member adjacent said runner track for mounting, by means cooperating with said upper surface recess, a claw member, said claw member extending over and providing a protective cover for said chain rollers and securing, by means of a shoulder member in the base of said claw member, the side member runner track to its respective side member; and longitudinal recesses in the outer side of each side member for mounting therein components associated with said chain conveyor system.

2. A chain conveyor system according to claim 1 in which a rod is secured in the side recess of one of said side members extending upwardly therefrom to a point above said carrier rollers for laterally guiding material being moved by said chain conveyor system.

3. A chain conveyor system according to claim 2 in which a protective means is secured in the side recess of the other side member, said means extending upwardly therefrom so as to project over at least a portion of said chain conveyor system.

* * * * *